ously. The bismuth columbate catalyst can be supported material is self-evident.

United States Patent Office 3,249,647
Patented May 3, 1966

3,249,647
OXIDATIVE DEHYDROGENATION OF ALKENES IN THE PRESENCE OF BISMUTH COLUMBATE
Jerzy Witold Dembinski, Evanston, Ill., assignor to Sinclair Research, Inc., New York, N.Y., a corporation of Delaware
No Drawing. Filed June 10, 1963, Ser. No. 286,455
4 Claims. (Cl. 260—680)

This invention relates to a novel catalytic process for the dehydrogenation of monoolefins to conjugated diolefins such as butadiene and isoprene.

An important factor in the production of diolefins such as butadiene and/or isoprene by dehydrogenation is the selectivity of the process. Many prior commercial dehydrogenation processes often require use of low pressures, usually about 5 to 25 p.s.i.a., to obtain a reasonable selectivity to the desired product. Under these low pressures and otherwise desired conditions, although a near optimum selectivity is obtained, the conversion obtained leaves much to be desired. Although the percent conversion can be raised by increasing the severity of the reaction conditions, this method of operation has proved unsatisfactory since the selectivity has been found to drop sharply as the conversion is increased. Low conversion processes have the disadvantage of requiring the work up of large amounts of material to recover sizeable amounts of the product. Thus, the demand for a dehydrogenation process that effects a high selectivity to the desired product together with relatively high conversion of feed is self-evident.

It has now been found that the dehydrogenation of monoalkenes in the presence of oxygen and certain catalysts provides high selectivity to the desired dialkene and at the same time a relatively high conversion of the monoalkene feed. In accordance with the present invention, the monoalkene to be dehydrogenated is contacted in the vapor phase at a temperature of about 370 to 650° C., preferably about 450 to 625° C., with a catalyst containing as the active ingredient a bismuth columbate, and in the presence of about 0.2 to 2 moles of oxygen per mole of monoalkene feed. Preferably, the amount of oxygen present is about 0.5 to 1.5 moles per mole of monoalkene. The oxygen may be supplied as pure or substantially pure oxygen, or dilute oxygen, e.g., air. The reaction is conveniently effected at or near atmospheric pressures but superatmospheric or reduced pressures can be employed if desired.

Hydrocarbon gas hourly space velocities of about 50 to 5000 can be used while still obtaining reasonable conversions. Preferred gas hourly space velocities are about 100 to 1000. Gas hourly space velocity (GHSV) is defined as the volumes of hydrocarbon reactant vapor calculated under standard conditions (STP) passed per hour per unit volume of the catalyst bed. In general, the process allows high space velocities to be used so that comparatively small reactors and catalyst inventories can be employed.

The bismuth columbate catalyst of the invention can be prepared employing any suitable method. Water-saluble bismuth salts such as bismuth nitrate can be employed to provide the bismuth and water-soluble salts of columbium such as columbium oxalate, citrate and lactate can be used to supply the columbium. It is preferred, however, to supply the columbium in the form of one of the heteropolyacids of columbium such as phosphocolumbic acid, borocolumbic acid, silicocolumbic acid, etc. and their water-soluble salts. In this method the heteropolyacid of columbium may be supplied as such or can be produced in situ, for instance, by preparing an aqueous solution of a water-soluble bismuth compound, a water-soluble salt of columbium and an acid such as boric acid, phosphoric acid, siliceous acid, etc. Thus, the catalyst may contain in addition to bismuth and columbium, up to about 1 atom of phosphorus, silicon, boron, etc., per 0.05 atom of columbium, usually at least 0.05 atom per atom of columbium. The atomic ratio of bismuth to columbium may vary, for instance, from about 1:5 to 2:1, although ratios of bismuth to columbium above 0.7:1 tend to decrease the activity of the catalyst.

One suitable method for preparing the catalyst, for example, involves coprecipitating the catalyst from a solution of bismuth nitrate or phosphate and columbium oxalate by neutralization with ammonia or ammonium hydroxide, followed by drying and calcining. The calcined material can then be crushed and pelletized. Another suitable method comprises mixing together dry bismuth nitrate or phosphate and columbic acid, and calcining or fusing. The calcination in these methods can be conducted at elevated temperatures, for instance, above about 350° C., e.g., up to about 650° or 700° C.

The bismuth columbate catalyst can be used per se or it can be supported on an inert carrier. Suitable carriers include, for instance, alpha-alumina, silica, gamma-alumina, crushed fire brick, pumice, etc. The preferred support is alpha-alumina. Any of known methods of providing the catalyst as bismuth columbate on the support can be employed. For example, the bismuth columbate can be coprecipitated on the support or it can be impregnated with water-soluble bismuth and columbium compounds or heteropolyacids of columbium, which compounds upon drying and calcination provide the bismuth columbate.

The dehydrogenation is preferably effected by employing the catalyst as a fixed bed of pellets or other micro-size particles over which the feed, preferably together with the oxygen, is continuously passed under the aforementioned reaction conditions. Alternatively, a fluidized bed of the catalyst can be used in which case the oxygen is advantageously introduced separately.

The feeds of the present invention are the monoalkenes including cycloalkene, of 4 to 7 non-quaternary contiguous carbon atoms, i.e., those that undergo dehydrogenation to the dienes, and they can be branched, straight-chain or cyclic in structure. Particularly suitable feeds are, for instance, the normal butenes such as butene-1, butene-2 or mixtures thereof; normal pentenes and their mixtures; isoamylenes such as 2-methylbutene-1, 2 methylbutene-2 and their mixtures. The dehydrogenation effected by the present invention produces of course a hydrocarbon product having the same number of carbon atoms as the feed but one more ethylenic bond. Thus, butadiene can be obtained for example by employing the normal butenes as a feed and isoprene by employing isoamylene as the feed. The total number of carbon atoms in the feed does not usually exceed twelve.

Recovery of the product from the gaseous effluent issuing from the reaction zone can be effected by any suitable method. For example, the effluent can be cooled by indirect heat exchange with the feed, washed with for instance dilute caustic to neutralize traces of acids present and the hydrocarbon product subjected to extractive distillation.

The following examples are included to further illustrate the process of the invention.

*Example I*

A bismuth columbate catalyst was prepared by neutralizing with aqueous ammonium hydroxide to a pH of 7, an aqueous solution of bismuth nitrite, boric acid and columbium oxalate. The neutralization was conducted at room temperature and the bismuth nitrite, boric acid and columbium oxalate were employed in proportions giving an atomic ratio of Bi:B:Cb of 1:1:4. The resulting precipitate was filtered, dried by heating for 2 hours up to 500° C. and calcined at 500° C. for four hours. The calcined catalyst was then crushed and pelletized.

Butene-1 and air in a volume ratio of 1:5 were passed over the thus-prepared catalyst at a hydrocarbon gaseous hourly velocity (GHSV) equal to 1150, at two different temperatures. The following results were obtained.

|  | 1 | 2 |
|---|---|---|
| Temperature, ° C | 562-500 | 601-532 |
| Conversion, percent | 55 | 53 |
| Selectivity to Butadiene, percent | 68 | 75 |

*Example II*

A bismuth columbate catalyst was prepared by mixing dry bismuth phosphate and columbic acid in an atomic weight ratio of Bi:Nb of about 1:2 and fusing. Butene-1 and air in a volume ratio of 1:5 were passed over the catalyst at a hydrocarbon gaseous hourly velocity equal to 600. The catalyst bed temperature was 600 to 529° C. At these conditions a 60.1% conversion of 1-butene at 73% selectivity to butadiene is obtained.

It is claimed:

1. A process for the dehydrogenation of monoalkenes of 4 to 7 non-quaternary contiguous carbon atoms to a hydrocarbon having the same number of carbon atoms but one more ethylenic bond which comprises contacting said monoalkene in the vapor phase in the presence of about 0.2 to 2 moles of oxygen per mole of said monoalkene with bismuth columbate catalyst at a temperature of about 370 to 650° C.

2. The process of claim 1 wherein the atomic ratio of bismuth to columbium in the catalyst is between about 1:5 to 2:1.

3. The process of claim 2 wherein the dehydrogenation is conducted at about atmospheric pressure.

4. The process of claim 3 wherein about 0.5 to 1.5 moles of oxygen per mole of monoalkene are employed.

References Cited by the Examiner

UNITED STATES PATENTS

| 2,326,258 | 8/1943 | Schmidt | 260—680 |
| 2,991,320 | 7/1961 | Hearne et al. | 260—680 |
| 3,207,806 | 9/1965 | Bajars | 260—680 |
| 3,207,808 | 9/1965 | Bajars | 260—680 |
| 3,207,810 | 9/1965 | Bajars | 260—680 |

PAUL M. COUGHLAN, *Primary Examiner.*